March 9, 1926.  
L. CHISAR  
1,576,133  
BALANCING DEVICE FOR MOTOR CYCLES AND THE LIKE  
Filed Sept. 5, 1924
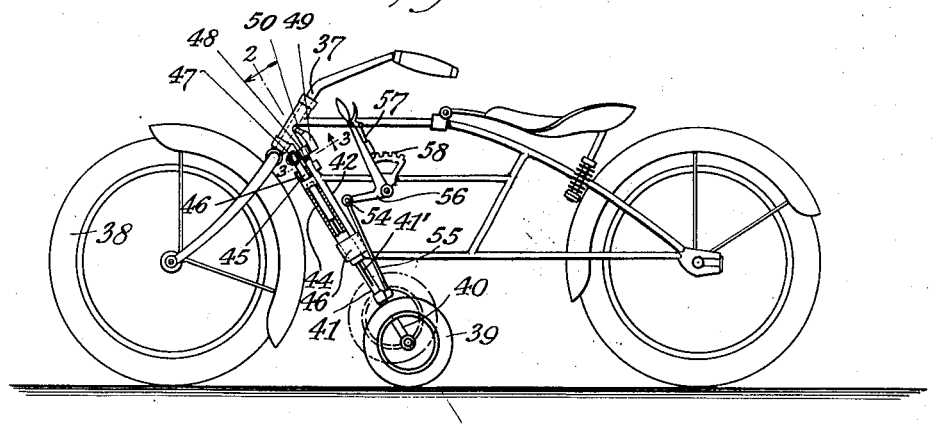
Fig.1.
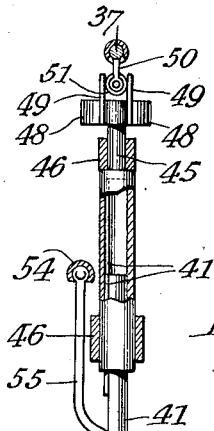
Fig.2.
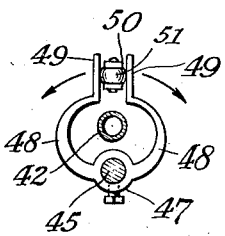
Fig.3.
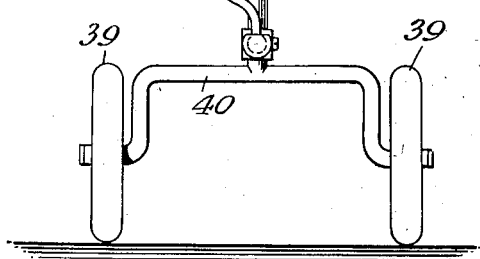
Louis Chisar  
Inventor
By his Attorney Patented Mar. 9, 1926.

1,576,133

UNITED STATES PATENT OFFICE.

LOUIS CHISAR, OF NEW YORK, N. Y.

BALANCING DEVICE FOR MOTOR CYCLES AND THE LIKE.

Application filed September 5, 1924. Serial No. 736,178.

*To all whom it may concern:*

Be it known that I, LOUIS CHISAR, a citizen of Hungary, and resident of New York, in the county of New York and State of New York, have invented certain new and useful Improvements in Balancing Devices for Motor Cycles and the like, of which the following is a specification.

This invention relates to a balancing device adapted to be attached to the frame of motorcycles, bicycles and the like.

The object of the invention is to provide a device of the above character which may be readily attached and which is connected in operative relation with the steering post of the vehicle, whereby its movements are automatically controlled by the movements of the handle bar or steering gear thereof.

Features of the invention reside in supporting means for a pair of ground rollers carried on a fork and positioned at the opposite sides of the machine, means for raising and lowering the rollers into and out of contact with the ground and for locking the rollers in a desired elevated position.

To these ends, and to such others as the invention may pertain, the same consists further, in a novel construction combination and adaptation of the parts, as will be hereinafter more fully described and claimed.

In the drawing:

Fig. 1 is a side view with parts in section showing my improved balancing device on the front portion of a motorcycle.

Fig. 2 is a partial section about on the line 2—2 of Fig. 1.

Fig. 3 is an enlarged section on the line 3—3 of Fig. 1.

Referring to the drawing, 37 indicates the steering post and 38 the front wheel, collectively comprising the steering gear of the motorcycle. The ground rollers or wheels 39 are carried by a fork 40, having a shank 41, which is slidably received in a tube 44, and is splined thereto as at 41' to rotate therewith, said tube is reduced at the top to form a rod 45. The tube 44 and its rod are revolubly supported in brackets or bearings 46 secured to the front bar 42 of the frame 43.

To the upper end of the rod 45 and close up to the steering post, I secure a collar 47, having curved arms 48, bridging the front bar 42 and terminating in spaced parallel plates 49, between which is a roller 51, carried on an arm 50, secured to the steering post 37, whereby the movements of arms 48 are controlled by the steering post to turn the tube 44 and fork 40 to cause the ground rollers to follow the general direction of the front wheel either to the right or left, in other words, the ground rollers are always turned in the plane of the steering wheel, thereby facilitating the execution of a sharp or quick turn while the said rollers are on the ground, when needed in an emergency.

To raise and hold the rollers 39 at a desired elevation, I provide a link 55 connected to a bell crank lever 56, by a universal joint 54 which permits swinging movement of the roller supporting fork 40.

The lever 56 has a spring controlled latch 57 adapted to engage a toothed segment 58 to support the rollers in elevated position when not in use.

What I claim is:—

1. A balancing device comprising in connection with the frame and steering gear of a motorcycle, a supporting structure including a tube having a rod extension, a fork carrying rollers said fork having a shank slidably carried in the tube and splined thereto, to revolve therewith, a pair of spaced arms on said steering gear for engaging the arms to cause the rollers to follow the general direction of the steering wheel and means to hold the rollers away from the ground when not in use.

2. In a balancing device for motorcycles and like vehicles having the usual rotatable front steering post and a frame structure, two balancing rollers at the opposite sides of said vehicle, rotatably secured in a bifurcated carrying member adapted to be raised or lowered by a link mechanism, a guide tube receiving said carrying member slidably secured therein, said tube being rotatably arranged on said frame and having two spaced apart wings secured thereto adjacent to the steering post, a finger fast on the steering post and adapted to press one or the other of said wings according to the direction into which the steering post is turned.

Signed at New York in the county of New York and State of New York this 6th day of August A. D., 1924.

LOUIS CHISAR.